United States Patent [19]

Tong et al.

[11] Patent Number: 4,956,439

[45] Date of Patent: Sep. 11, 1990

[54] HIGH PERFORMANCE MODIFIED POLYURETHANES

[76] Inventors: Shen-Nan Tong, #9, Lane 182, Lin-Shen Road; Shih-Jung Tsai, #10, Alley 7, Lane 10, Sec. 2, Chien-Kung Rd., both of Hsin-chu; Jyi-Shang Lii, #137, Sec. 2, San-Ho Road, San-chung City, all of Taiwan

[21] Appl. No.: 404,501

[22] Filed: Sep. 8, 1989

Related U.S. Application Data

[63] Continuation of Ser. No. 152,134, Feb. 4, 1988, abandoned.

[51] Int. Cl.$^5$ ............... C08G 18/32; C08G 18/18; C08G 18/24
[52] U.S. Cl. ............................. 528/53; 528/54; 528/55; 528/58; 528/76; 528/80; 528/83; 528/84; 528/85; 524/871; 524/875; 524/876; 525/454
[58] Field of Search .............. 524/871, 875, 876; 525/454; 528/53, 54, 55, 58, 76, 80, 83, 84, 85

[56] References Cited

U.S. PATENT DOCUMENTS

| | | | |
|---|---|---|---|
| 3,706,680 | 12/1972 | Booth | 528/85 |
| 4,041,208 | 8/1977 | Seeger et al. | 528/288 |
| 4,254,069 | 3/1981 | Dominquez et al. | 521/904 |
| 4,272,618 | 6/1981 | Dominquez et al. | 521/160 |
| 4,301,110 | 11/1981 | Cuscurida et al. | 528/58 |
| 4,314,962 | 2/1982 | Wollensak et al. | 528/85 |

Primary Examiner—Maurice J. Welsh
Assistant Examiner—Rabon Sergent
Attorney, Agent, or Firm—Darby & Darby

[57] ABSTRACT

Modified polyurethane products, exhibiting good physical strength and excellent heat resistance, and especially improved heat sag properties, are prepared by blending a polyol component containing at least 1% of at least one polynuclear aromatic polyol or a derivative thereof, or a mononuclear diol or a derivative thereof, at a temperature of 100°–180° C., to form a first liquid component; admixing the first liquid component with a second liquid component containing a diisocyanate or polyisocyanate, one of the two liquid components containing a catalyst; and reacting and molding the admixture in a mold kept at a temperature of from 80°–140° C. by reaction injection molding.

9 Claims, No Drawings

HIGH PERFORMANCE MODIFIED POLYURETHANES

This is a continuation of application Ser. No. 152,134, filed Feb. 4, 1988, now abandoned.

BACKGROUND OF THE INVENTION

Traditional polyurethane-reaction injection molding (PU-RIM) has been, for many years, applied to selfskin foams, microcellular elastomers, shoe soles, furniture, decorative articles, automotive bumpers, and dashboards. Innovational usage on automotive exterior parts, such as hoods, the trunk doors, body covers, fenders and doors have been attempted but have not been very successful, mainly because the stiffness and heat-sag properties of traditional PU-RIM are not sufficient to endure on-line painting.

The chemicals used in traditional polyurethane reaction injection molding are generally in the liquid state at room temperature. They can be easily mixed at ambient temperature but the products have low rigidity and poor heat resistance and therefore are not considered as a suitable material for exterior automotive components.

It is well known that the polyurethane molecule is composed of two segments, namely, a hard segment and a soft segment, which influence its physical and mechanical properties. The structure and relative amounts of the hard and soft segments are mainly dependent on the ratio of the raw materials and structure of polyol and chain extender. The chain extenders used in traditional room temperature PU-RIM have a low melting point. These are generally in the liquid state at room temperature and include ethylene glycol, diethylene glycol, propylene glycol, dipropylene glycol and 1,4-butane diol. When they react with diisocyanate to build the hard segment in polyurethane molecular structure, poor physical properties result because of the nature of aliphatic molecular structure.

BRIEF DESCRIPTION OF THE INVENTION

In brief compass, the instant invention relates to a new polyurethane production process, for preparing modified polyurethane products having improved physical properties. The raw materials used are mononuclear aromatic diols or diamine, di-nuclear aromatic diols or diamine, polynuclear aromatic polyol and their derivatives. These components are used alone or blended with each other or other polyols to react with diisocyanates or polyisocyanates.

To overcome the drawbacks of the prior art, the instant invention uses components which are in the solid or the semi-solid state at room temperature to react with the diisocyanates or polyisocyanates to Prepare unique modified polyurethane products.

Suitable mono- or polynuclear aromatic diols and polyols are: 4,4'-isopropylidene diphenol, bis-(p-chlorophenoxy) methane dichlorophene, bis-(2-hydroxyethyl) terephthalate, bis-(2-hydroxybutyl) terephthalate, halogenated bis-phenol A, hydroquinone, tolylenediamine and 4,4'-diaminodiphenylmethane.

DETAILED DESCRIPTION OF THE INVENTION

As an essential feature, the instant invention uses a solid state polynuclear aromatic polyol or polyamine, mononuclear diol or diamine with a high melting point to replace at least 1%, preferably 10 to 50%, of the liquid aliphatic glycols. In addition, the aforesaid compounds with hydroxyl or amino functionality can be used to replace conventional polyurethane chain extender. The products thus obtained--urethane or urea structures which contain phenyl groups--have improved physical properties, especially improved heat-resistance, stiffness and dimensional stability.

The polynuclear aromatic polyol or polyamine, the mononuclear diol or diamine with phenyl groups are in solid state at room temperature. Accordingly, they cannot be used in traditional PU-RIM processing where the long chain, high molecular weight polyol chain extender, other additives and the diisocyanate are fed to the mixing head by a metering pump. After impingement mixing in the mixing head, the components are injected directly into the mold having a relatively low mold temperature.

In contrast, in the instant invention, the polyurethane is produced by first pre-mixing the polyether or the polyester polyol with the polynuclear aromatic polyol or polyamine at a temperature sufficiently high to maintain a liquid state. The liquid mixture is then fed to the mixing head with diisocyanate. The mixing is performed at a temperature of from 70° to 200° C., preferably from 100° to 180° C. The high temperature mixture is then injected into the mold where the mold is maintained at a temperature from 40° to 180° C., preferably from 80° to 140° C.

In the instant invention, any traditional PU catalysts can be used to get a desirable effect. Base catalysts or metal salt catalysts can be used alone or in combination in the formulation, generally in an amount ranging from 0.1 to 2 pph, based on the raw materials. Tertiary amines (e.g., DABCO) or metal salts (e.g., DBTDL), when used in a proper proportion (e.g., 0.1 to 2 pph DABCO and 0.1 to 2 pph DBTDL), are the best catalysts.

Conventional polyols used in RIM include polyester and polyether polyols. Polyether polyols include the oxyalkylated derivatives of a polyhydric compound having 2 or more reactive hydroxyl groups such as, for example, ethylene glycol, propylene glycol, trimethylol propane, pentaerythritol, and mixtures thereof.

Other suitable polyols include the oxyalkylated derivatives of an amine compound such as, for example, ammonia, ethylenediamine, propylenediamine, 1,6-hexanediamine, diethylenetriamine, triethylenediamine, tetraethylenepentamine, and mixtures thereof. Oxyalkylating agents which are reacted with the hydroxyl-containing or amine-containing compounds or mixtures thereof include, for example, such vicinal epoxides as ethylene oxide, propylene oxide, 1,2-butylene oxide, 2,3-butylene oxide, epichlorohydrin, epibromohydrin, styrene oxide, butylglycidyl ether, phenylglycidyl ether, mixtures thereof and the like.

Suitable polyester polyols include those hydroxyl terminated reaction products of a dibasic acid or anhydride such as adipic acid, maleic acid, phthalic acid, their anhydrides and mixtures thereof with a glycol, i.e., a dihydroxyl containing compound such as ethylene glycol, propylene glycol, 1,4-butane diol, 1,6-hexane diol or mixtures thereof.

Suitable polyisooyanates which may be employed in the compositions of the present invention include, for example, any organic polyisocyanate having 2 or more NCO groups per molecule and no other substituents capable of reacting with the hydroxyl groups of the polyol. Suitable such polyisocyanates include, for example, 2,4-toluenediisocyanate, 2,6-toluenediisocyanate, hexamethylene diisocyanate, p,p'-diphenylmethanediisocyanate, p-phenylenediisocyanate, halogenated methylene diphenyldiisocyanate, naphthalene diisocyanate, dianisidine diisocyanate, polymethylene polyphenyl-isocyanate, and mixtures of one or more polyisocyanates.

Other organic isocyanates which may be employed and which are the organic polyisocyanates include isocyanate terminated prepolymers prepared from the previously mentioned polyols and the above-mentioned isocyanates.

The preparation of the high performance modified polyurethane of the instant invention is disclosed in the following examples:

EXAMPLE 1

Compositions of the polyurethane of the instant invention are prepared by first heating polyether polyol or polyester polyol and polynuclear aromatic polyol or diamine (according to their respective melting points). While maintained in the liquid state, the heated components are mixed and pumped by a metering pump to the mixing head to mix with diisocyanates or polyisocyanates. They are then injected into the mold for polymerization and molding. The mixing head, tank and piping are kept under constant temperature throughout the process.

In this example, bis-(2-hydroethyl) terephthalate (BHET) and polyether polyol are mixed in the tank at a temperature of from 100 to 120° C. to make the mixture a homogeneous solution. Catalyst and surfactant are added into the tank when the temperature is brought down to and maintained at 80–85° C. In another tank, diisocyanates are kept at a temperature from 30–40° C. Components contained in these two separate tanks are pumped via a metering pump into the mixing head. They are then injected into the mold where the temperature is 80–90° C. The composition formula is listed in Table 1.

TABLE 1

| | Composition of Polyurethane | |
|---|---|---|
| | Method | |
| Composition | Conventional Method (parts by wt) | Instant Invention (parts by wt) |
| (a) Diisocyanate | 96.26 | 96.26 |
| (b) Polyether Polyol | 100 | 100 |
| Ethylene Glycol | 16.4 | 13.1 |
| (c) BHET | — | 26.5 |
| Triethylene Diamine | 0.1 | 0.1 |
| Dibutyltin Dilaurate | 0.3 | 0.3 |
| (d) Surfactant | 2.0 | 2.0 |

(a) Diisocyanate (VM-30): from ICI
(b) Polyether polyol (GE-330): from Chiunglong
(c) BHET: Bis(2-hydroxyethyl) terephthalate
(d) DC-5043: from Dow Corning The end product so obtained has improved physical properties, especially flexural strength, flexural modulus and heat sag. Table 2 compares the physical properties of the polyurethane prepared by conventional method and by the instant invention.

TABLE 2

| | Comparison of Physical Properties | | |
|---|---|---|---|
| Physical Properties | Testing Method | Conventional Product | Instant Invention |
| Tensile Strength (kg/cm²) | ASTM D-412 | 213 | 277 |
| Flexural Strength (kg/cm²) | ASTM D-790 | 41.9 | 297 |
| Flexural Modulus (kg/cm²) | ASTM D-790 | 1050 | 7990 |
| Tear Strength (kg/cm) | ASTM D-624 | 56.5 | 67.3 |
| Hardness (Shore D) | ASTM D-2240 | 60 | 73 |
| Heat Sag (m/m) | ASTM D-3769 | 15.25 | 8.62 |

EXAMPLE 2

In this example, 4,4'-isopropylidene diphenol is used to react with diisocyanate. The only different between this example and Example 1 is that the 4,4'-isopropylidene diphenol and polyether polyol are preheated to about 150–160° C. before mixing. The compositions are listed in Table 3:

TABLE 3

| | Composition of Polyurethane | |
|---|---|---|
| | Method | |
| Composition | Conventional Method (parts by wt) | Instant Invention (parts by wt) |
| (a) *Diisocyanate (VM-30) | 96.26 | 96.26 |
| (b) *Polyether Polyol (GE-330) | 100 | 100 |
| Ethylene Glycol | 16.4 | 13.1 |
| 4,4'-isopropylidene diphenol | — | 6.03 |
| DABCO | 0.1 | 0.1 |
| DBTDL | 0.3 | 0.3 |
| Surfactant DC-5043 | 2.0 | 2.0 |

By using 4,4'-isopropylidene diphenol, the end product has improved tear strength as well as heat sag, as clearly shown in Table 4:

TABLE 4

| | Comparison of Physical Properties | | |
|---|---|---|---|
| Physical Properties | Testing Method | Conventional Product | Instant Invention |
| Tensile Strength (kg/cm²) | ASTM D-412 | 213 | 168 |
| Flexural Strength (kg/cm²) | ASTM D-790 | 41.9 | 64.5 |
| Flexural Modulus (kg/cm²) | ASTM D-790 | 1050 | 1180 |
| Tear Strength (kg/cm) | ASTM D-624 | 56.5 | 80.6 |
| Hardness (Shore D) | ASTM D-2240 | 60 | 70 |
| Heat Sag (m/m) | ASTM D-3769 | 15.25 | 7.38 |

EXAMPLE 3

In this example, hydroquinone is used to react with diisocyanate. The only difference between this example and Example 1 is that it is necessary to preheat hydroquinone and polyether polyol to 170-180° C. before mixing. The compositions are listed in Table 5:

TABLE 5

| | Composition of Polyurethane Method | |
|---|---|---|
| Composition | Conventional Method (parts by wt) | Instant Invention (parts by wt) |
| (a) *Diisocyanate (VM-30) | 96.26 | 96.26 |
| (b) *Polyether Polyol (GE-330) | 100 | 100 |
| Ethylene Glycol | 16.4 | 13.1 |
| Hydroquinone | — | 5.82 |
| DABCO | 0.1 | 0.1 |
| DBTDL | 0.3 | 0.3 |
| DC-5043 | 2.0 | 2.0 |

The comparison of the physical properties of the product of the invention to the conventional product is shown in Table 6:

TABLE 6

| | Comparison of Physical Properties | | |
|---|---|---|---|
| Physical Properties | Testing Method | Conventional Product | Instant Invention |
| Tensile Strength (kg/cm$^2$) | ASTM D-412 | 213 | 222 |
| Flexural Strength (kg/cm$^2$) | ASTM D-790 | 41.9 | 31.8 |
| Flexural Modulus (kg/cm$^2$) | ASTM D-790 | 1050 | 195 |
| Tear Strength (kg/cm) | ASTM D-624 | 56.5 | 79.6 |
| Hardness (Shore D) | ASTM D-2240 | 60 | 67 |
| Heat Sag (m/m) | ASTM D-3769 | 15.25 | 10.72 |

It is clearly shown in Table 6 that, when hydroquinone is used, both tear strength and heat sag are improved significantly.

EXAMPLE 4

To further enhance the strength and heat sag, various reinforcing materials such as glass fiber, carbon fiber and boron fiber can be added to the composition of the polyurethane as disclosed in the instant invention. The processing conditions are the same as described in Example 3, except glass fiber is added to hydroquinone. The temperature of the polyol is increased to 10° C. to keep the viscosity low. The composition is listed in Table 7:

TABLE 7

| | Composition of Polyurethane Method | |
|---|---|---|
| Composition | Conventional Method (parts by wt) | Instant Invention (parts by wt) |
| (a) Diisocyanate (VM-30) | 96.26 | 96.26 |
| (b) Polyether Polyol (GE-330) | 100 | 100 |
| Ethylene Glycol | 16.4 | 14.76 |
| Hydroquinone | — | 2.91 |
| *Glass Fiber | — | 23.53 |
| DABCO | 0.1 | 0.1 |
| DBTDL | 0.3 | 0.3 |

TABLE 7-continued

| | Composition of Polyurethane Method | |
|---|---|---|
| Composition | Conventional Method (parts by wt) | Instant Invention (parts by wt) |
| DC-5043 | 2.0 | 2.0 |

*EC10-W (Vetrotox)

Table 8 clearly shows that flexural strength and flexural modulus increased about 10 times, and heat sag increased about 5 times.

TABLE 8

| | Comparison of Physical Properties | | |
|---|---|---|---|
| Physical Properties | Testing Method | Conventional Product | Instant Invention |
| Tensile Strength (kg/cm$^2$) | ASTM D-412 | 213 | 218.5 |
| Flexural Strength (kg/cm$^2$) | ASTM D-790 | 41.9 | 420 |
| Flexural Modulus (kg/cm$^2$) | ASTM D-790 | 1050 | 10580 |
| Tear Strength (kg/cm) | ASTM D-624 | 56.5 | 87.0 |
| Hardness (Shore D) | ASTM D-2240 | 60 | 72 |
| Heat Sag (m/m) | ASTM D-3769 | 15.25 | 3.52 |

We claim:

1. A method for molding a heat resistant modified polyurethane, which comprises:

blending a polyol component containing at least 1% of at least one room temperature solid or semi-solid state polynuclear aromatic polyol or a derivative thereof, or mononuclear diol or a derivative thereof, at a temperature of from 100 to 180° C., so as to form a heated first liquid component;

admixing said heated first liquid component with a second liquid component containing a diisocyanate or a polyisocyanate, one of said components containing a catalyst; and reacting and molding said admixture of the first and second liquid components in a mold maintained at a temperature of from 80° to 140° C.

2. The method of claim 1 wherein the mononuclear diol or derivative thereof has the formula

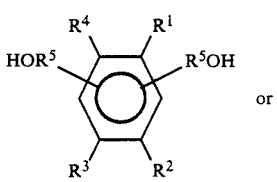

or

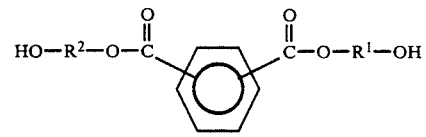

where $R^1$—$R^4$ = H or $C_1$-$C_4$ alkyl
$R^5$ = $C_0$-$C_4$ alkyl where $R^1$—$R^2$ = $C_1$-$C_4$ alkyl.

3. The method of claim 1 wherein the polynuclear polyol or derivative thereof has the formula

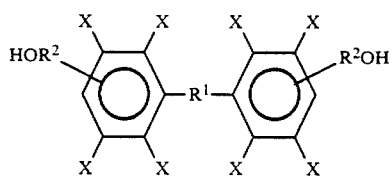

where
$R^1 = C_0$–$C_4$ alkylene,

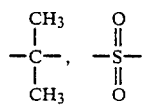

$R^2 = C_0$–$C_6$ alkyl, X = H or halogen.

4. The method of claim 1 wherein the polyol component contains from 1 to 100% of the polynuclear aromatic polyol or derivative thereof, or mononuclear diol or derivative thereof.

5. The method of claim 1 wherein from 0.1 to 2.0 pph of the catalyst is present, and said catalyst is 1,4-diazo[2.2.2]bicyclo-octane, dibutyltin dilaurate, a tertiary amine, metal carboxylate or a combination thereof.

6. The method of claim 5 wherein the catalyst is a mixture of 1,4-diazo[2.2.2]bicyclo-ocatane and dibutyltin dilaurate, and the amount of 1,4-diazo[2.2.2]bicyclo-octane is from 0.1 to 2.0 pph and the amount of dibutyltin dilaurate is from 0.1 to 2.0 pph.

7. The method of claim 1 wherein the reaction medium also contains reinforcing materials.

8. The method of claim 7 wherein the reinforcing material is fiber glass, carbon fiber or Kelvar fiber.

9. The product prepared by the method of claim 1.

* * * * *